(12) United States Patent
Zheng

(10) Patent No.: US 8,565,597 B2
(45) Date of Patent: Oct. 22, 2013

(54) LABEL SWITCHING METHOD, APPARATUS AND SYSTEM

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 304 days.

(21) Appl. No.: 13/087,830

(22) Filed: Apr. 15, 2011

(65) Prior Publication Data

US 2011/0188857 A1 Aug. 4, 2011

Related U.S. Application Data

(63) Continuation of application No. PCT/CN2009/074399, filed on Oct. 10, 2009.

(30) Foreign Application Priority Data

Oct. 15, 2008 (CN) .......................... 2008 1 0217020

(51) Int. Cl.
*H04J 14/00* (2006.01)
(52) U.S. Cl.
USPC ............... 398/51; 398/54; 398/70; 398/71
(58) Field of Classification Search
USPC ........... 398/70, 71, 72, 66, 67, 63, 58, 57, 54, 398/51
See application file for complete search history.

(56) References Cited

U.S. PATENT DOCUMENTS

| 7,054,557 B1 | 5/2006 | Dasylva et al. | |
| 7,319,700 B1 * | 1/2008 | Kompella ..................... | 370/400 |
| 7,873,277 B2 * | 1/2011 | Kazawa et al. ................. | 398/68 |
| 2007/0211763 A1 | 9/2007 | Solomon et al. | |
| 2008/0198857 A1 | 8/2008 | Kim et al. | |

FOREIGN PATENT DOCUMENTS

| CN | 1592302 A | 3/2005 |
| CN | 1725756 A | 1/2006 |
| CN | 1823546 A | 8/2006 |
| EP | 1351449 A1 | 10/2003 |
| JP | 2007-208944 A | 8/2007 |

OTHER PUBLICATIONS

Extended European Search Report in corresponding European Patent Application No. 09820243.5 (Aug. 27, 2012).

(Continued)

*Primary Examiner* — M. R. Sedighian
(74) *Attorney, Agent, or Firm* — Leydig, Voit & Mayer, Ltd.

(57) ABSTRACT

A label switching method is provided. When a Passive Optical Network (PON)-based Label Switching Path (LSP) is established, a PON logical service transmission channel is established between an Optical Line Terminal (OLT) and an Optical Network Unit (ONU). According to an identifier (ID) of the PON logical service transmission channel as a PON label, a PON-based Forwarding Information Base (FIB) table on the ONU is updated, and a PON-based Label Forwarding Information Base (LFIB) table on the OLT is updated, where the PON-based LFIB table records a forwarding relationship between an ingress port plus an ingress label and an egress port plus an egress label, and the PON-based FIB table records a forwarding relationship between the ingress port plus a destination address and the egress port plus the egress label. Therefore, the problems between network segments of different forwarding characteristics, protocol variation, inter-segment conversion, and mapping and control complexity are avoided.

20 Claims, 11 Drawing Sheets

(56) References Cited

OTHER PUBLICATIONS

Intellectual Property Office of the People's Republic of China, 1$^{st}$ Office Action in Chinese Application No. 200810217020.9 (Dec. 28, 2011).

International Searching Authority, Written Opinion of International Application No. PCT/CN2009/074399 (Jan. 14, 2010).

International Telecommunication Union (ITU), Telecommunication Standardization Sector of ITU, "Series G: Transmission Systems and Media, Digital Systems and Networks; Digital Selections and Digital Line System—Optical Line Systems for Local and Access Networks; Gigabit-capable Passive Optical Networks (G-PON): Transmission Convergence Layer Specification," G.984.3 (Mar. 2008).

International Search Report in corresponding PCT Application No. PCT/CN2009/074399 (Jan. 14, 2010).

\* cited by examiner

501

A GEM port channel is established between an OLT and an ONU; according to a GEM port ID as a PON label, a PON-based FIB table on the ONU is updated, and a PON-based LFIB table on the OLT is updated.

502

When a data packet arrives at the ONU, the ONU performs forwarding according to the PON-based FIB table, converts the data packet to a packet with the PON label, and forwards the packet to the OLT, the OLT queries the PON-based LFIB table according to an ingress PON interface and the ingress label of the received packet for performing label switching, and transmits the packet to a next hop node (for example, PON-LSR/MPLS-LSR) according to the egress interface and the egress label after the label switching. Alternatively, when a data packet arrives at the OLT, the OLT queries the PON-based LFIB table according to the ingress interface and an MPLS label for performing label switching, and transmits the packet to the ONU according to an egress PON interface and an egress PON label after the label switching, and the ONU forwards the received packet with the PON label according to the PON-based FIB table.

FIG. 5

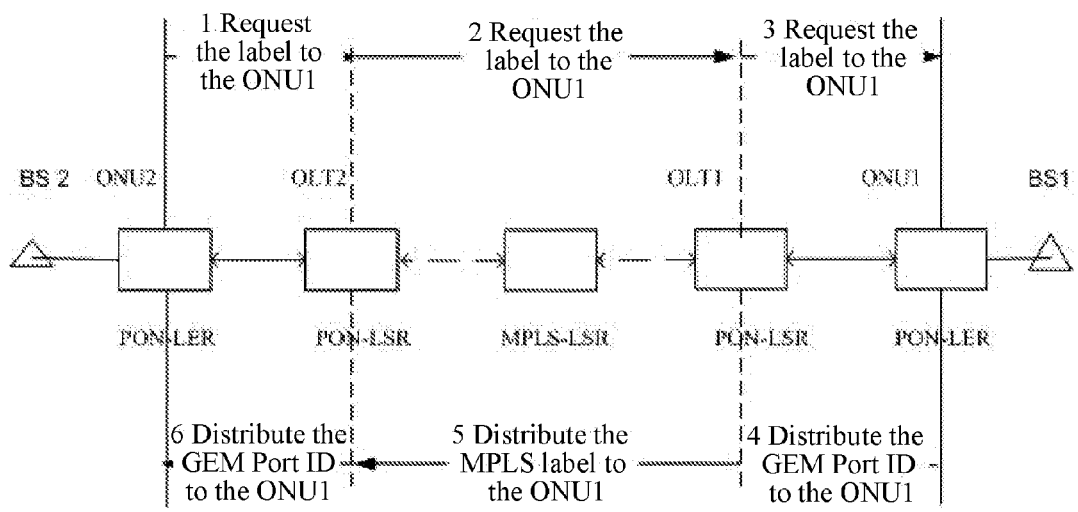

FIG. 6

| Ingress Interface | Ingress label ( 20bits ) | Egress Interface | Egress label ( 20bits ) |
|---|---|---|---|
| 1 | "FF" + "123"(GEM port ID) | 1 | "FF" + "321"(GEM port ID) |
| 2 | "FF" + "132"(GEM port ID) | 2 | "45321"(MPLS label) |
| 3 | "12354"(MPLS label) | 3 | "FF" + "231"(GEM port ID) |
| n | "12345"(MPLS label) | m | "54321"(MPLS label) |

FIG. 7a

| Ingress Interface | Ingress label ( 20bits ) | Egress Interface | Egress label ( 20bits ) |
|---|---|---|---|
| 1 | "F" + "1234"(LLID) | 1 | "F" + "4321"(LLID) |
| 2 | "F" + "1111"(LLID) | 2<br>3 | "11111"(MPLS label)<br>"22222"(MPLS label) |
| 3 | "33333"(MPLS label) | 4<br>5 | "F" + "2222"(LLID)<br>"F" + "3333"(LLID) |
| n | "12345"(MPLS label) | m | "54321"(MPLS label) |

FIG. 7b

| Ingress Interface | Target Address | Egress Interface | Egress label ( 20bits ) |
|---|---|---|---|
| 1 | IP@1 | 1 | "FF" + "321"(GEM port ID) |
| n | IP@2 | m | "54321"(MPLS label) |

FIG. 8a

| Ingress Interface | Target Address | Egress Interface | Egress label ( 20bits ) |
|---|---|---|---|
| 1 | IP@1 | 1 | "F" + "4321"(LLID) |
| n | IP@2 | m | "54321"(MPLS label) |

//!# LABEL SWITCHING METHOD, APPARATUS AND SYSTEM

CROSS-REFERENCE TO RELATED APPLICATIONS

This application is a continuation of International Application No. PCT/CN2009/074399, filed on Oct. 10, 2009, which claims priority to Chinese Patent Application No. 200810217020.9, filed on Oct. 15, 2008, both of which are hereby incorporated by reference in their entireties.

FIELD OF THE INVENTION

The present invention relates to the field of data communications, and in particular, to a label switching method, apparatus, and system.

BACKGROUND OF THE INVENTION

In the conventional Passive Optical Network (PON)-based mobile bearer network, as shown in FIG. 1, a PON is adopted for mobile bearer on various types of services from a Base Station (BS). The BS may be a Base Transceiver Station (BTS) of a $2^{nd}$ generation (2G) mobile network, where the BTS accesses the PON through E1/T1 Time Division Multiplexing (TDM); the BS may be a NodeB of a $3^{rd}$ generation (3G) mobile network, where the NodeB accesses the PON through Asynchronous Transfer Mode (ATM)/Inverse Multiplexing over ATM (IMA); and the BS may also be an eNodeB of a Long Term Evolution (LTE) mobile network, where the eNodeB accesses the PON through a Fast Ethernet (FE)/Gigabit Ethernet (GE). Afterwards, the PON is connected to a aggregate gateway through a metropolitan-area convergence network, and the aggregate gateway is further connected to a mobile network element, for example, a Base Station Controller (BSC) of the 2G mobile network, a Radio Network Controller (RNC) of the 3G mobile network, or an Access Gateway (AGW) of the LTE mobile network. The metro convergence network is usually a Packet Switched Network (PSN) implemented through a Multi-Protocol Label Switching (MPLS) technology.

For a Gigabit Passive Optical Network (GPON) and a next generation GPON, a PON logical service transmission channel is a GPON Encapsulation Method (GEM) port, and is identified by using a GEM port identifier (ID). For an Ethernet Passive Optical Network (EPON) and a next generation EPON, the PON logical service transmission channel is a Logical Link Identifier (LLID) channel, and is identified by using an LLID.

For the conventional PON-based mobile bearer network, a convergence node is required to have various types of interfaces (for example, an ATM interface, an E1/T1 interface, a Synchronous Digital Hierarchy (SDH) interface, and an FE/GE interface) to support various types of service. Further, both an Optical Line Terminal (OLT) and an Optical Network Unit (ONU) of the existing PON-based mobile bearer network need to perceive ATM/IMA, E1/T1 TDM, and ETH services. As a result, the implementation is complex. The inventor finds that a major problem needs to be solved about how ATM/IMA service, E1/T1 TDM service, Ethernet (ETH) service, or Internet Protocol (IP) service can be carried over an aggregation node, i.e., Provider Edge (PE).

SUMMARY OF THE INVENTION

In view of the above problems, embodiments of the present invention provide a label switching method, apparatus, and system.

An embodiment of the present invention provides a label switching method, where the method includes:

when establishing a PON-based Label Switching Path (LSP) (PON-based LSP), establishing a PON logical service transmission channel between an OLT and an ONU, and according to an ID, which acts as a PON label, of the PON logical service transmission channel, updating a PON-based Forwarding Information Base (FIB) table on the ONU, and updating a PON-based Label Forwarding Information Base (LFIB) table on the OLT, where the PON-based LFIB table records a forwarding relationship between an ingress port plus an ingress label and an egress port plus an egress label, and the PON-based FIB table records a forwarding relationship between the ingress port plus a destination address and the egress port plus the egress label; and when a data packet arrives at the ONU, forwarding, by the ONU, according to the PON-based FIB table on the ONU, the data packet to the OLT, wherein the forwarding the data packet to the OLT comprises: converting the data packet to a packet with the PON label, and forwarding the packet with the PON label to the OLT; querying, by the OLT, the PON-based LFIB table, according to an ingress PON interface which acts as the ingress port and the ingress label of the received data packet, for performing label switching, and transmitting the packet to a next hop node, according to the egress port and the egress label after the label switching; or when a data packet arrives at the OLT, querying, by the OLT, the PON-based LFIB table according to the ingress port of the data packet and an MPLS label which acts as the ingress label, for performing label switching, and transmitting the packet to the ONU, according to an egress PON interface which acts as the egress port and an egress PON label which acts as the egress label, and forwarding, by the ONU, the received packet with the PON label, according to the PON-based FIB table.

An embodiment of the present invention provides an OLT, including a control plane processing module and a data plane processing module, where the control plane processing module is configured to establish a PON logical service transmission channel between the OLT and an ONU, distribute a PON label, and generate a PON-based LFIB table according to the PON label; and the data plane processing module is configured to query the PON-based LFIB table according to an ingress port and an ingress label of a received data packet to obtain a corresponding egress port and a corresponding egress label, perform label switching on the input data packet, and output the data packet carrying the corresponding egress label from the corresponding egress port.

An embodiment of the present invention provides an ONU, including a control plane processing module and a data plane processing module, where the control plane processing module is configured to cooperate with the ONU to establish a PON logical service transmission channel between the OLT and the ONU, distribute a PON label, and generate a PON-based FIB table according to the PON label; and the data plane processing module is configured to query the PON-based FIB table according to a destination address of a data packet to obtain a corresponding egress port and a corresponding egress label, carry the data in a corresponding PON frame according to the egress label, and output the data packet from the egress port for performing forwarding.

An embodiment of the present invention provides a label switching system, including the OLT and the ONU mentioned above.

According to the solutions disclosed in the embodiments of the present invention, ATM/IMA, E1/T1 TDM, ETH, or IP service is perceived only by a PON-Label Edge Router (LER) edge node, i.e. ONU, of a switching network with PON labels and MPLS labels which are used in a mixed way, and a PON-Label Switched Router (LSR) (OLT)/MPLS LSR in the switching network with a PON label and an MPLS label which are used in a mixed way does not need to perceive the ATM/IMA, E1/T1 TDM, ETH, or IP service. As a result of the current invention, the PON-LSR (OLT)/MPLS LSR in the network is greatly simplified.

BRIEF DESCRIPTION OF THE DRAWINGS

FIG. 5 is a flow chart of a label switching method according to an embodiment of the present invention;

FIG. 6 is a schematic view of processing of a control plane according to an embodiment of the present invention;

FIG. 7a is a schematic view of a GPON-based LFIB table according to an embodiment of the present invention;

FIG. 7b is a schematic view of an EPON-based LFIB table according to an embodiment of the present invention;

FIG. 8a is a schematic view of a GPON-based FIB table according to an embodiment of the present invention;

DETAILED DESCRIPTION OF THE EMBODIMENTS

In the embodiments of the present invention, for a GPON and a next generation GPON, a GEM port channel is considered as a special MPLS channel, a GEM port ID is considered as a special MPLS label, GEM port addressing and label switching are combined, that is, the GEM port ID is used for frame addressing filtering, and the switching may be implemented through the label; for an EPON and a next generation EPON, a logical service channel constituted by an LLID is considered as a special MPLS channel, the LLID is considered as a special MPLS label, LLID addressing and label switching are combined, that is, the LLID is used for frame addressing filtering, and the switching may be implemented through the label. Similarly, for other types of PONs, including an ATM Passive Optical Network (APON), a Broadband Passive Optical Network (BPON), and a next generation PON, a corresponding attribute ID is used as a special MPLS label, but for ease of description, in the embodiments of the present invention, the GEM port ID/LLID, collectively referred to as the PON label, is used as a representative for description, the PON label is considered as a special MPLS label, a PON segment is referred to as a PON Label Switching Domain (LSD), and an MPLS segment is referred to as an MPLS LSD.

Figure 1:
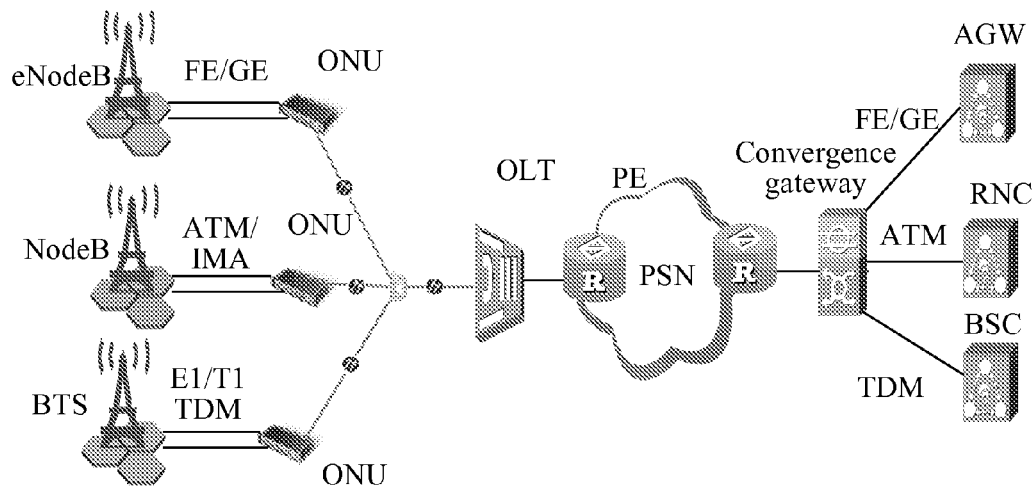
FIG. 1 is a schematic view of a PON-based mobile bearer network in the prior art.
Figure 2A:
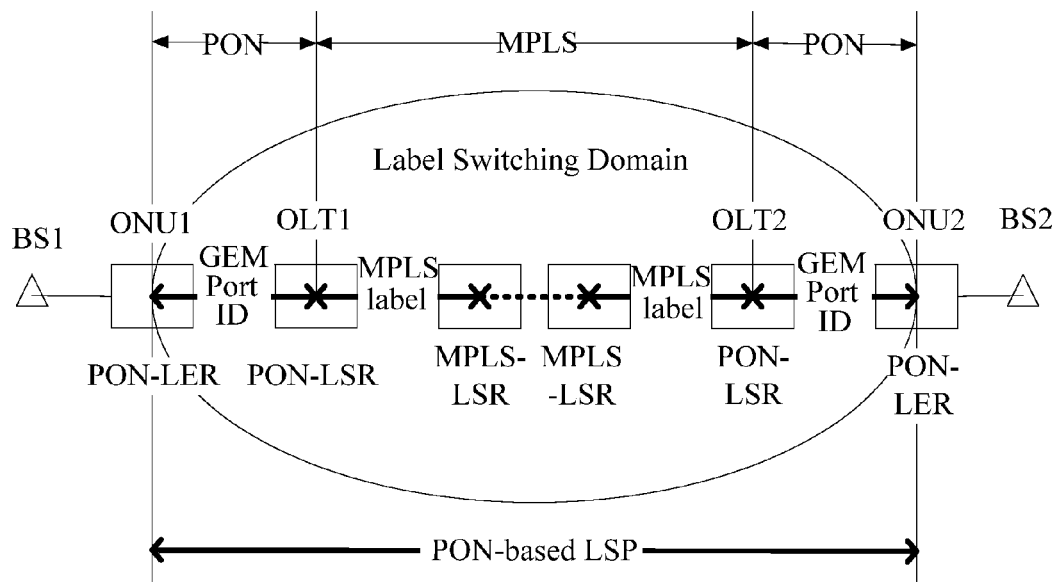
FIG. 2a is a schematic view a of a label switching network according to an embodiment of the present invention.

In a switching network with PON labels and MPLS labels which are used in a mixed way, as shown in FIG. 2a, an ONU is a special LER, and is referred to as a PON-LER; an OLT is a special LSR, and is referred to as a PON-LSR. The PON-LER is a router forwarding a packet from a PON LSD, which functions to analyze an ATM cell header, a TDM time-slot, an ETH frame header, or an IP packet header, and is used for determining a corresponding delivery level and an LSP. The PON-LSR is similar to a general IP switch, and is a Layer 3 packet forwarding and PON-based label switching device in the PON LSD.

Therefore, when forwarding an End-To-End (e2e) service based on a PON-based LSP is established, the PON label of the PON segment and the MPLS label of the MPLS segment constitute the PON-based LSP. Through the PON-based LSP formed by the set of the PON-LSR and the MPLS LSR through which the transmission passes, a packet with specific Forwarding Equivalence Class (FEC) is forwarded by using a mixed PON and MPLS label switching and forwarding mechanism. The packet with the FEC defines a group of ATM cells, TDM time-slots, ETH frames, or IP packets, and in view of the forwarding behavior, the packets with the FEC of them have the same forwarding attribute.

Specifically, in the switching network with PON labels and MPLS labels which are used in a mixed way, at the ingress PON-LER, the packets are divided into different FECs according to different forwarding demands, and each specific FEC is mapped to a next hop, that is, each specific ATM cell, TDM time-slot, ETH frame, or IP packet entering the network is designated to a certain specific FEC. Each specific FEC is encoded into a PON label, and a packet is encapsulated into a PON frame corresponding to the PON label, and is forwarded to the next hop. On subsequent PON-LSR/MPLS LSR of each hop, the ATM cell header, the TDM time-slot, the ETH frame header, or the IP packet header does not need to be analyzed, but the PON label/MPLS label is used as a pointer to point at a next hop output port and a new PON label/MPLS label, and the new PON label/MPLS label is forwarded through the designated output port after the old PON label/MPLS label is replaced with the new PON label/MPLS label. At an egress PON-LER, after the encapsulation of the PON frame containing the PON label is removed, the ATM cell, the TDM time-slot, the ETH frame, or the IP packet is forwarded to a destination by using an IP routing mechanism or other forwarding mechanisms.

Figure 2B:
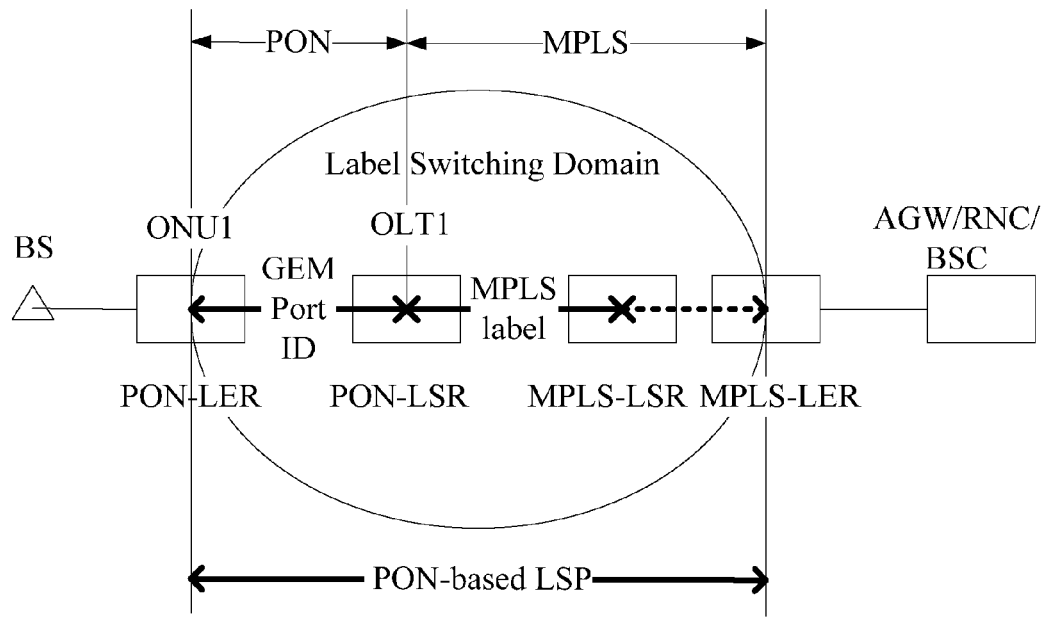
FIG. 2b is a schematic view b of a label switching network according to an embodiment of the present invention.
Figure 2C:
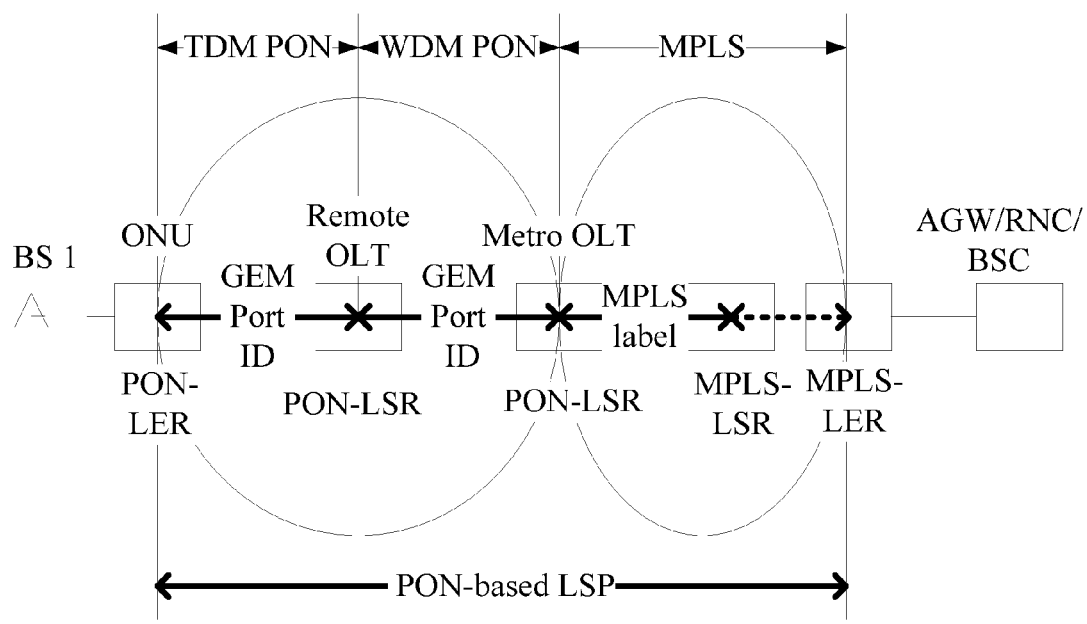
FIG. 2c is a schematic view c of a label switching network according to an embodiment of the present invention.

Alternatively, after the packet arrives at the last MPLS LER, the MPLS-LER performs removing label processing, directly sends the packet to an AGW/RNC/BSC for processing, as shown in FIG. 2b. Further, the two solutions may be extended to a situation that the PON LSD is a multi-level PON cascade, for example, the PON LSD is a TDM PON and WDM PON engineering network, as shown in FIG. 2c, a first level PON is the TDM PON (for example, EPON/GPON), a second level PON is the WDM PON, that is, the OLT (for example, a Remote OLT in FIG. 2c) of the first level PON performs backhaul by adopting a point to point WDM PON, and the Remote OLT is equivalent to a special ONU for the OLT (for example, a Metro OLT in FIG. 2c) of the WDM PON. A processing procedure is similar to the manner described above, where the switching is performed according to the PON label of the GEM port ID/LLID.

Figure 3:
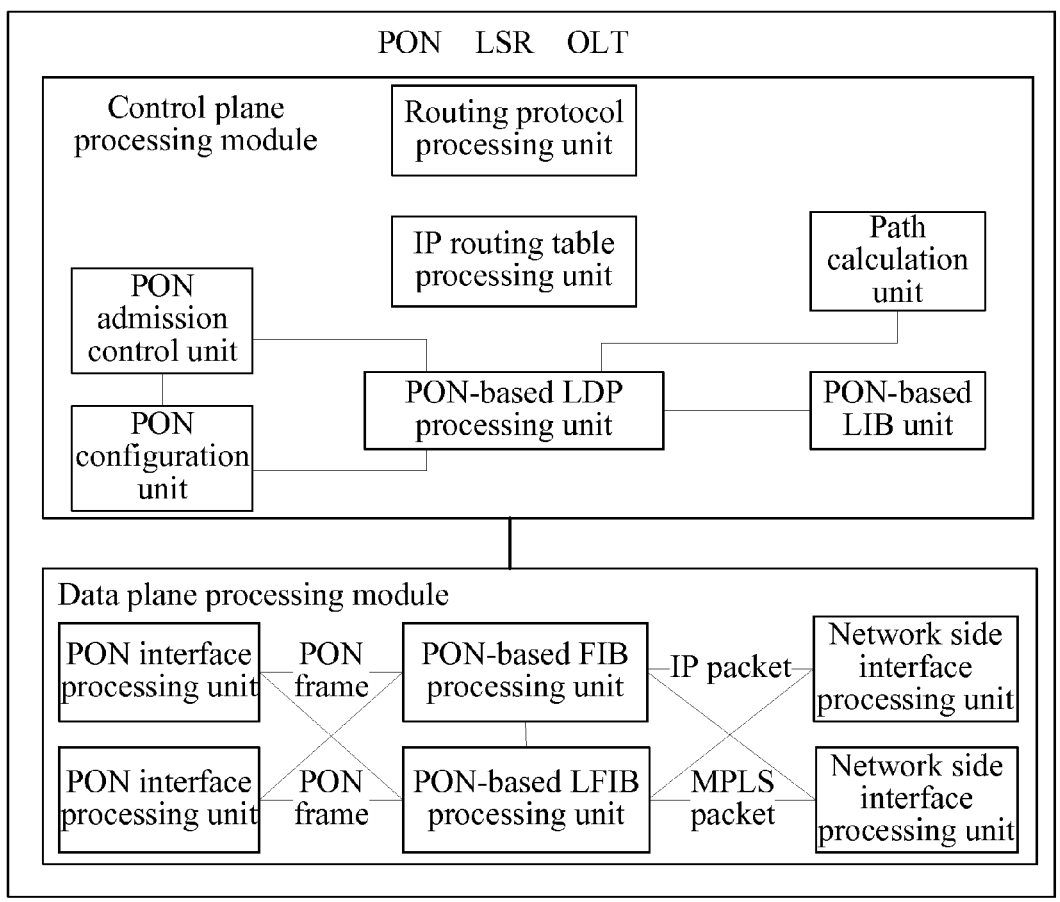
FIG. 3 is a view of internal modules of a PON-LSR according to an embodiment of the present invention.

An embodiment of the present invention further provides a PON-LSR, that is, an OLT, as shown in FIG. 3.

The PON-LSR includes a control plane processing module and a data plane processing module. The control plane processing module is configured to establish a PON logical service transmission channel (for example, a channel corresponding to a GEM port or an LLID) between the OLT and an ONU, distribute a PON label, and generate a PON-based LFIB table according to the PON label. A routing protocol processing unit of the control plane processing module exchanges Layer 3 routing information with other PON-LSRs/MPLS-LSRs, so as to establish a routing table, where the routing table is stored and maintained by an IP routing table processing unit. In the control plane, a PON-based Label Distribution Protocol (LDP) processing unit exchanges binding information of the PON label (or the MPLS label) for the route with other PON-LSRs/MPLS-LSRs through an LDP (for example, LDP/Resource Reservation Protocol (RSVP), that is, distributes the PON label, so as to establish a PON-based Label Information Base (LIB) table. Meanwhile, the PON-based LFIB table is generated according to the routing table and the PON-based LIB table, and optionally, a PON-based FIB table is generated.

The data plane processing module is configured to query the PON-based LFIB table according to a PON label (or MPLS label) of an input PON frame/MPLS packet to obtain a corresponding egress port and a corresponding egress label, perform label switching, convert the input PON frame (or MPLS packet) to an MPLS packet (or PON frame) carrying the corresponding egress label, and output the packet from the corresponding egress port. In addition, a control signaling is transmitted in an IP routing manner. The data plane processing module queries the PON-based FIB table according to a destination address of the input IP packet to obtain a corresponding egress port and a corresponding egress PON label, performs forwarding, bears the input IP packet in the PON frame carrying the corresponding egress PON label, and outputs the PON frame from the corresponding egress port.

Further, the control plane processing module includes a PON-based LDP processing unit and a PON configuration unit; and optionally includes a routing protocol processing unit, an IP routing table processing unit, a PON-based LIB unit, and a path calculation unit.

The PON-based LDP processing unit is configured to exchange the binding information of the PON label (or the MPLS label) for the route with other PON-LSRs (or MPLS-LSRs) through the LDP (for example, the extended LDP/RSVP, an Operation, Administration and Maintenance (OAM), or an Optical Network Termination (ONT) Management Control Interface (OMCI) protocol), that is, distribute the PON label, so as to establish the PON-based LIB table. Then, a neighbor PON-LSR/MPLS-LSR is advertised of the binding of a route entry and a local label, and the binding of the route entry and the PON label advertised by the neighbor PON-LSR/MPLS-LSR is received and stored in the PON-based LIB table. Finally, in the case that the network routes converge, the PON-based LFIB table is generated according to information of the PON-based routing table and the PON-based LIB table, and optionally, the PON-based FIB table may also be generated. Optionally, the PON-based LDP processing unit interacts with the PON configuration unit and/or the PON admission control unit, so as to implement interworking between the PON configuration protocol (for example, the OMCI or the OAM) and the LDP/RSVP.

The PON configuration unit is configured to configure the PON logical service transmission channel (for example, the channel corresponding to the GEM port or the LLID), for example, establish, modify, or delete the PON logical service transmission channel; optionally, the PON configuration unit is further configured to implement a label distribution function, that is, distribute the label by using a the PON configuration protocol, for example, the OMCI protocol or the OAM protocol.

The routing protocol processing unit is configured to exchange the routing information with other devices, and generate the routing table. The adopted protocol may be an Open Shortest Path First (OSPF) protocol, a Routing Information Protocol (RIP), or a Border Gateway Protocol (BGP).

The IP routing table processing unit is configured to store and maintain the PON-based routing table, where the maintenance includes establishment and modification.

The PON-based LIB unit is configured to store and maintain the PON-based LIB table.

The corresponding IP routing table may also adopt static configuration, and here, the routing protocol processing unit may be omitted.

Optionally, the control plane processing module further includes a PON admission control unit and a path calculation unit. The PON admission control unit is configured to implement PON admission control (for example PON interface bandwidth admission control), and trigger execution of the PON admission control through the LDP (for example, the RSVP). The path calculation unit is configured to trigger establishment of a PON-based LSP, and optionally, is further configured to calculate the optimal LSP.

Further, the data plane processing module includes a PON-based LFIB processing unit, a PON interface processing unit, and a network side interface processing unit, and may further include a PON-based FIB processing unit; and the number of the PON interface processing unit and the network side interface processing unit may be one or more.

The PON-based LFIB processing unit is configured to store and maintain the PON-based LFIB table, and implement a mixed PON and MPLS label switching and forwarding function according to the PON-based LFIB table.

The PON-based FIB processing unit is configured to store and maintain the PON-based FIB table, and implement a PON label based routing and forwarding function according to the PON-based FIB table.

The PON interface processing unit implements a PON interface communication processing function.

The network side interface processing unit implements a network side interface communication processing function.

Figure 4A:
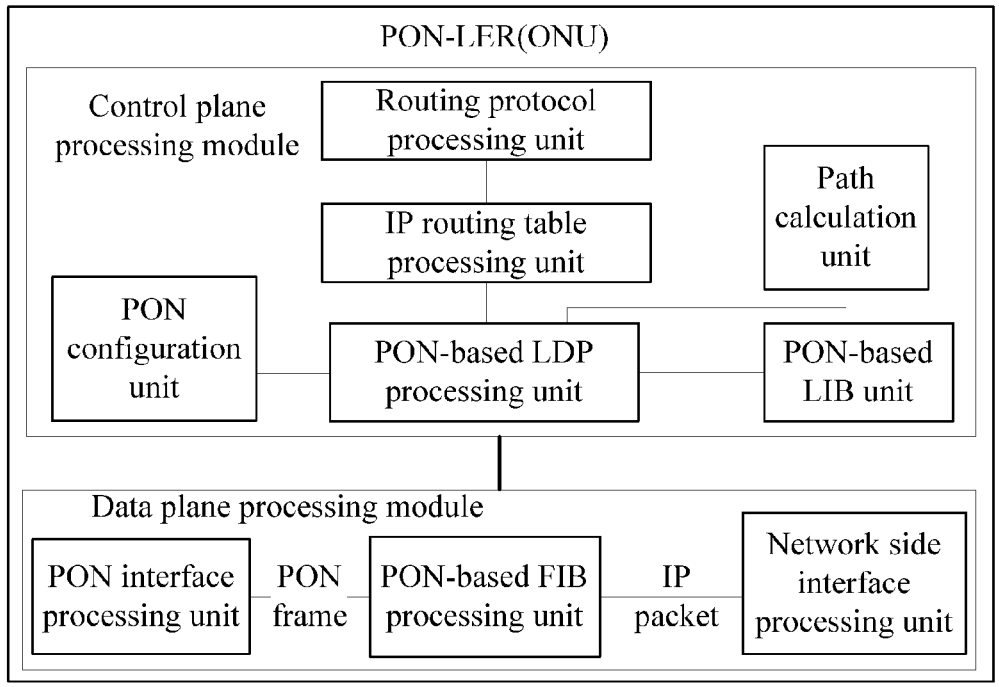
FIG. 4a is a view a of internal modules of a PON-LER according to an embodiment of the present invention.

An embodiment of the present invention further provides a PON-LER, that is, an ONU, as shown in FIG. 4a.

The PON-LER includes a control plane processing module and a data plane processing module. The control plane processing module is configured to cooperate with the ONU to establish a PON logical service transmission channel (for example, a channel corresponding to a GEM port or an LLID) between the OLT and the ONU, distribute a PON label, and generate a PON-based FIB table according to the PON label. The control plane processing module exchanges routing information with other devices, so as to establish a routing table, generates the PON-based FIB table according to the routing table, and maintains the PON-based FIB table.

The data plane processing module queries the PON-based FIB table according to a destination address of an input ATM cell, TDM time-slot, ETH frame, or IP packet to obtain a corresponding egress port and a corresponding egress label, performs routing and forwarding, bears the input ATM cell, TDM time-slot, ETH frame, or IP packet to a PON frame carrying the corresponding egress label, and outputs the PON frame from the egress port.

Further, the control plane processing module includes a PON-based LDP processing unit and a PON configuration unit; and optionally, includes a routing protocol processing unit, an IP routing table processing unit, a PON-based LIB unit, and a path calculation unit.

The PON-based LDP processing unit is configured to exchange the binding information of the PON label (or the MPLS label) for the route with other PON-LSRs (or MPLS-LSRs) through the LDP (for example, the extended LDP/RSVP, an OAM, or an OMCI protocol), that is, distribute the PON label, so as to establish the PON-based LIB table. Then, a neighbor PON-LSR/MPLS-LSR is advertised of the binding of a route entry and a local label, and the binding of the route entry and the PON label advertised by the neighbor PON-LSR/MPLS-LSR is received and stored in the PON-based LIB table. Finally, in the case that the network routes converge, the PON-based FIB table is generated according to information of the PON-based routing table and the PON-based LIB table.

The PON configuration unit is configured to configure the PON logical service transmission channel, for example, establish, modify, or delete the PON logical service transmission channel.

The routing protocol processing unit is configured to exchange Layer 3 routing information with other devices, and generate the routing table.

The IP routing table processing unit is configured to store and maintain the routing table.

The PON-based LIB unit is configured to store and maintain the PON-based LIB table, where the PON-based LIB table is configured to assist the generating of the PON-based FIB table.

The path calculation unit is configured to trigger the establishment of a PON-based LSP, and optionally, is further configured to calculate the optimal LSP.

Further, the data plane processing module includes a PON-based FIB processing unit, a PON interface processing unit, and a network side interface processing unit.

The PON-based FIB processing unit is configured to store and maintain the PON-based FIB table, and implement a PON label based routing and forwarding function according to the PON-based FIB table.

The PON interface processing unit implements a PON interface communication processing function.

The network side interface processing unit implements a network side interface communication processing function.

Figure 4B:
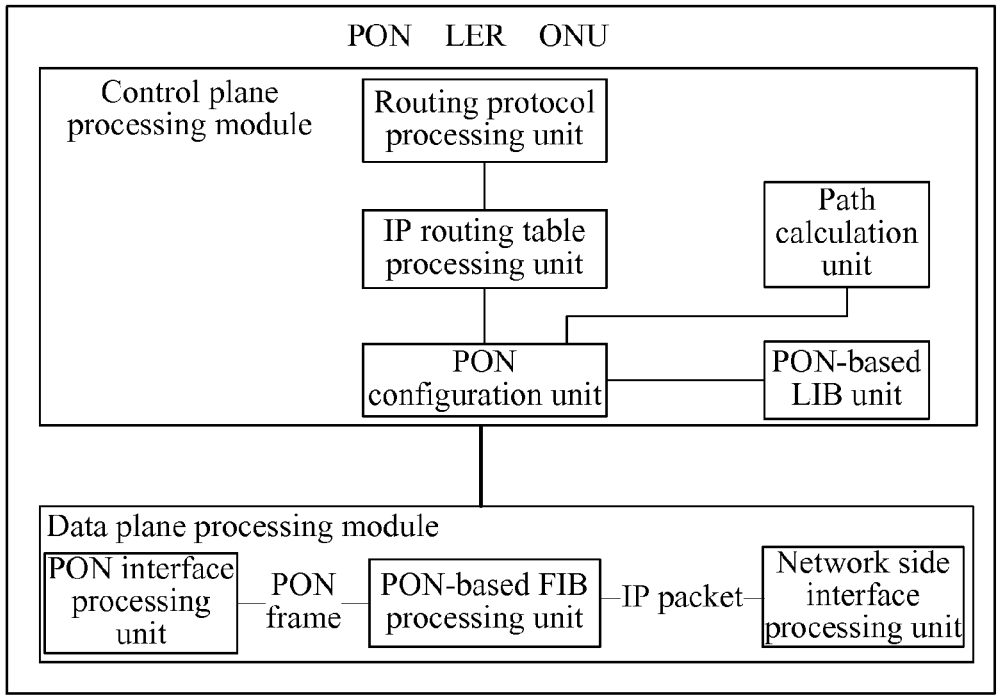
FIG. 4b is a view b of internal modules of a PON-LER according to an embodiment of the present invention.

Alternatively, the PON-LER may also adopt an internal structure as shown in FIG. 4b. Different from the structure as shown in FIG. 4a, in FIG. 4b, the control plane processing module includes a PON configuration unit, a routing protocol processing unit, an IP routing table processing unit, a PON-based LIB unit, and a path calculation unit. That is to say, in addition to being configured to configure the PON logical service transmission channel, the PON configuration unit has the functions of establishing the PON-based FIB table and distributing the label of the PON-based LDP processing unit; for the GPON and the next generation GPON, the PON configuration unit implements the functions by adopting the OMCI protocol implement; and for the EPON and the next generation EPON, the PON configuration unit implements the functions by adopting the OAM protocol.

In the following, the network as shown in FIG. 2a is used as a representative to describe the embodiments of the present invention. A network signal transmission procedure includes two stages, one is a path negotiation and establishment procedure at the control plane, and the other is a data transmission procedure according to the established path at the data plane; that is, processing procedures respectively corresponding to the control plane and the data plane of each network entity (for example, the PON-LSR/PON-LER). It is assumed that the PON-based LSP is from a source ONU (that is, an ONU1 in FIG. 2a) to a target ONU (that is, an ONU2 in 2a) through an OLT1 and an OLT2, a label switching method according to an embodiment of the present invention includes the following steps, as shown in FIG. 5.

In step 501, a GEM port channel is established between an OLT (for example, the OLT1 in FIG. 2a, the OLT1 in FIG. 2b, and the OLT in FIG. 2c) and an ONU (the ONU1 in FIG. 2a, the ONU1 in FIG. 2b, and the ONU in FIG. 2c); according to a GEM port ID which acts as a PON label, a PON-based FIB table on the ONU is updated, a PON-based LFIB table on the OLT is updated, and optionally the PON-based FIB table on the OLT is updated.

Each entry of the PON-based LFIB table includes an ingress port, an egress port, an ingress label, and an egress label, and records a forwarding relationship between the ingress port plus the ingress label and the egress port plus the egress label; and each entry of the PON-based FIB table includes an ingress port, an egress port, a destination address, and an egress label, and records a forwarding relationship between the ingress port plus the destination address and the egress port plus the egress label.

In step 502, when a data packet arrives at the ONU, the ONU performs forwarding according to the PON-based FIB table, converts the data packet to a packet with the PON label, and forwards the packet to the OLT, the OLT queries the PON-based LFIB table according to an ingress PON interface and the ingress label of the received packet for performing label switching, and transmits the packet to a next hop node (for example, PON-LSR/MPLS-LSR) according to the egress port and the egress label after the label switching.

Alternatively, when a data packet arrives at the OLT, the OLT queries the PON-based LFIB table according to the ingress port and an MPLS label for performing label switching, and transmits the packet to the ONU (PON-LER) according to an egress PON interface and an egress PON label after the label switching, and the ONU forwards the received packet with the PON label according to the PON-based FIB table.

In the following, the GPON or the next generation GPON is set as an example for detailed description, for the EPON, the processing procedure is similar, except that the GEM port ID is replaced with the LLID, and the OMCI is replaced with the OAM.

When distribution of the mixed PON and MPLS label may be finished through carrying the PON label through the extended LDP/RSVP, step 501 further includes the following steps, as shown in FIG. 6.

1-2. The ONU2 requests to establish a PON-based LSP from the ONU2 to the ONU1; from the ONU2 to the OLT1, the next level node sends a PON label/MPLS label request message with the destination being the ONU1 to the previous level node hop by hop, where the message may be implemented through a Path/label request message.

3-4. When the request message arrives at the OLT1, the OLT1 performs PON admission control, and when the OLT1 allows establishing the GEM port channel corresponding to the PON label, the OLT1 sends a PON label request message and a GEM port ID creating request message to the ONU1, where the GEM port ID creating request message carries the distributed GEM port ID (for example, ID A), and after the ONU1 finishes creating the GEM port ID according to the received GEM port ID, the PON configuration unit of the ONU1 sends a GEM port ID creating acknowledgement message to the OLT1; meanwhile, according to the label request message, the GEM port ID is used as the PON label with the destination being the ONU1, the PON-based LFIB table on the ONU is updated according to the PON label, and a Reserve (Resv) message/label mapping message is returned to the OLT1, where the message carries the distributed PON label with the distributed destination being the ONU1, where for the GPON and the next generation GPON, the creating message and the creating acknowledgement message are sent through the OMCI protocol; the ONU1 updates the PON-based FIB table on the OLT1 according to the PON label.

5. After receiving the Resv message/label mapping message sent by the ONU1, the OLT1 updates the PON-based LFIB table on the OLT1 according to the carried PON label; from the OLT1 to the OLT2, the previous level node distributes the PON label/MPLS label with the destination being the ONU1 to the next level node hop by hop, where the label may be carried by using the Resv message/label mapping message.

6. After receiving the Resv message/label mapping message, the OLT2 sends the GEM port ID creating request message to the ONU2, where the GEM port ID creating request message carries the GEM port ID (for example, ID B) distributed to the ONU2; after the ONU2 finishes creating the GEM port ID, the PON configuration unit of the ONU2 sends the GEM port ID creating acknowledgement message to the OLT2, where the message is sent through the OMCI protocol; meanwhile, the OLT2 uses the GEM port ID as the PON label with the destination being the ONU1, updates the PON-based LFIB table on the OLT2 according to the distributed PON label, and sends the distributed PON label with the destination being the ONU1 to the ONU2 through the Resv message/label mapping message; the ONU2 updates the PON-based FIB table on the ONU2 according to the PON label.

The OLT supports the LDP/RSVP as the LDP, the ONU adopts the OMCI protocol as the LDP, and when the OLT supports interworking between the PON configuration protocol (for example, the OMCI) and the LDP/RSVP, similarly, step 501 further includes the following steps.

1-2. The ONU2 requests to establish a PON-based LSP from the ONU2 to the ONU1; the OLT2 performs PON admission control, and when the OLT2 allows establishing the GEM port channel corresponding to the PON label, from the ONU2 to the OLT1, the next level node sends a PON label/MPLS label request message with the destination being the ONU1 to the previous level node hop by hop, where the message may be implemented through a Path/label request message.

3-4. When the request message arrives at the OLT1, the OLT1 performs PON admission control, and when the OLT1 allows establishing the GEM port channel corresponding to the PON label, the OLT1 sends a GEM port ID creating request message to the ONU1, where the message carries the distributed GEM port ID (for example, ID A), and after the ONU1 finishes creating the GEM port ID, the PON configuration unit sends a GEM port ID creating acknowledgement message to the OLT1, where for the GPON and the next generation GPON, the creating message and the creating acknowledgement message are sent through the OMCI protocol; the ONU1 also uses the GEM port ID as the PON label with the destination being the ONU1, and updates the PON-based FIB table on the ONU1 according to the PON label.

5. After receiving the GEM port ID creating acknowledgement message sent by the ONU1, the OLT1 also uses the GEM port ID as the PON label with the destination being the ONU1, and updates the PON-based LFIB table on the OLT1 according to the PON label; from the OLT1 to the OLT2, the previous level node distributes the PON label/MPLS label with the destination being the ONU1 to the next level node hop by hop, where the label message may be carried by using the Resv message/label mapping message.

6. After receiving the Resv message/label mapping message, the OLT2 sends the GEM port ID creating request message to the ONU2, where the GEM port ID creating request message carries the GEM port ID (for example, ID B) distributed to the ONU2; after finishing creating the GEM port ID according to the GEM port ID, the ONU2 sends the GEM port ID creating acknowledgement message to the OLT2, where the message is sent through the OMCI protocol; meanwhile, the OLT2 and the ONU2 use the GEM port ID as the PON label, and respectively update the PON-based LFIB table on the OLT2 and the PON-based FIB table on the ONU2.

Each PON-LSR may perform the PON interface bandwidth admission control, and when the bandwidth demand is not satisfied, the establishment of the PON-based LSP is terminated. In the following, with a specific format example of the PON-based FIB table and the PON-based LFIB table, a data switching manner in step 502 is specifically described.

A label entry of the PON-based LFIB table is set to be 20 bits, the MPLS label is 20 bits, the GEM port ID is 12 bits, and the LLID is 16 bits, so that in the GPON-based LFIB table, the 20-bit label entry is formed by an 8-bit special padding prefix and a 12-bit GEM port ID, and the 8-bit special padding prefix may be set as "FF" (hexadecimal); in the EPON-based LFIB table, the 20-bit label entry is formed by a 4-bit special padding prefix and a 16-bit LLID, and the 4-bit special padding prefix may be set as "F" (hexadecimal). Ingress Interface is an ingress port, and Egress Interface is an egress port. The ingress port and the egress port may be the same port, that is, the forwarding in the same PON port is implemented, and here, the ingress label and the egress PON label cannot be the same.

The label entry may be a unicast PON label/unicast MPLS label, or may be a multicast PON label/multicast MPLS label. After being forwarded, a packet corresponding to one multicast PON label/multicast MPLS label may be a packet corresponding to another multicast PON label/multicast MPLS label; and after being forwarded, a packet corresponding to one multicast PON label/multicast MPLS label may also be a packet corresponding to a group of unicast PON labels/unicast MPLS labels.

In the following, through the specific format of the PON-based LFIB table and the PON-based FIB table, the mixed PON and MPLS label switching procedure and the route switching procedure are described in detail.

FIGS. 7a and 7b respectively show the detailed contents of the GPON-based LFIB table and the EPON-based LFIB table.

Figures 8B, 9:
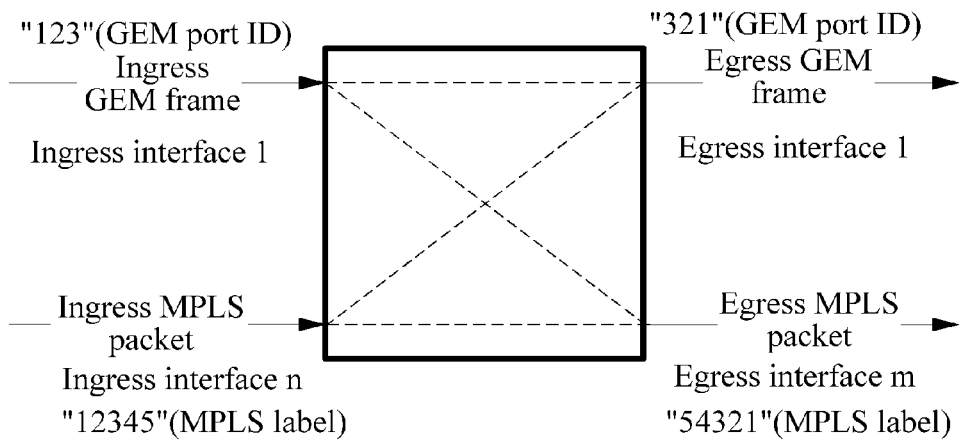
FIG. 8b is a schematic view of an EPON-based FIB table according to an embodiment of the present invention.
FIG. 9 is a schematic view of a label switching procedure according to an embodiment of the present invention.

The label switching and forwarding procedure is as shown in FIG. 9. When the PON frame (for example, a GEM frame) arrives at the PON-LSR, the PON-LSR queries the GPON-based LFIB table according to the ingress port (for example, the ingress GPON interface 2) and the ingress label (for example, GEM port ID=132 plus the prefix "FF") of the GEM frame to obtain the egress port (for example, the egress port 2)

and the egress label (for example, the MPLS label=45321), and the PON-based LFIB processing unit removes the GEM frame header, then adds an MPLS packet header, where the MPLS label is the queried value of the egress label (for example, MPLS label=45321), and sends the MPLS packet from the egress port (for example, the egress port 2).

On the contrary, when the MPLS packet arrives at the PON-LSR, the PON-LSR queries the GPON-based LFIB table according to the ingress port (for example, the ingress port 3) and the ingress label (for example, the MPLS label=12354) of the MPLS packet to obtain the egress port (for example, the egress PON interface 3) and the egress label (for example, "FF"+231), and the PON-based LFIB processing unit removes the MPLS packet header, then adds the GEM frame header, where the GEM port ID is the queried egress label value without the prefix "FF" (for example, GEM port ID=231), and then sends the GEM frame from the egress port (for example, the egress GPON interface 3).

The above procedure is also applicable to the situation of p-t-mp multicast, for example, when the PON frame (for example, the EPON MAC frame) arrives at the PON-LSR, the PON-LSR queries the EPON-based LFIB table according to the ingress port (for example, the EPON interface 2) and the ingress label (for example, LLID=1111 plus the prefix "F") of the EPON MAC frame to obtain N pairs of egress ports and egress labels (for example N=2, being respectively the egress port 2 and the MPLS label=11111, and the egress port 3 and the MPLS label=22222), and the PON-based LFIB processing unit removes the EPON MAC frame header, then replicates the payload of the EPON MAC frame, where the payload of the EPON MAC frame is replicated for N copies when N pairs of egress ports and egress labels are queried, then sequentially adds the first copy of the payload of the EPON MAC frame to the MPLS packet header, where the MPLS label is the first queried egress label value (for example, MPLS label=11111), . . . , adds the $N^{th}$ (N=2) copy of the payload of the EPON MAC frame to the MPLS packet header, where the MPLS label is the $N^{th}$ (N=2) queried egress label value (for example, MPLS label=222222), and then respectively sends each MPLS packet from the corresponding egress port, for example, sends the first MPLS packet from the egress port 2, . . . , and sends the $N^{th}$ (N=2) MPLS packet from the egress port 3.

For ease of description, the network side which is the IP interface is used as an example, and the detailed contents of the GPON-based FIB table and the EPON-based FIB table are as shown in FIGS. 8a and 8b. A label entry of the PON-based FIB table is set to be 20 bits, and similarly, in the GPON-based FIB table, the 20-bit label entry is formed by an 8-bit special padding prefix and a 12-bit GEM port ID, and the 8-bit special padding prefix may be set as "FF" (hexadecimal); in the EPON-based FIB table, the 20-bit label entry is formed by a 4-bit special padding prefix and a 16-bit LLID, and the 4-bit special padding prefix may be set as "F" (hexadecimal). For the situation that the network side is the ATM interface, the Target Address is a VPI and a VCI of the ATM. For the situation that the network side is the TDM interface, the Target Address is the time-slot number of the TDM.

A processing procedure according to the GPON-based FIB table is set as an example. When the IP packet arrives at the PON-LER, the PON-based FIB processing unit of the PON-LER queries the GPON-based FIB table according to the ingress port (for example, ingress port 1) and the destination address (for example, IP@1) of the IP packet to obtain the egress port (for example, the egress GPON interface 1) and the egress label (for example, "FF"+"321"), and the PON-based FIB processing unit adds the GEM frame header to the IP packet, and before adding the GEM frame header, optionally adds the ETH frame header, where the GEM port ID is the queried egress label value without the prefix "FF" (for example GEM port ID=321), and then sends the GEM frame from the egress port (for example, the egress GPON interface 1). The PON-based FIB table in the PON-LSR has the same function, and the processing procedure is similar, so that the details will not be described herein again.

Figure 10A:
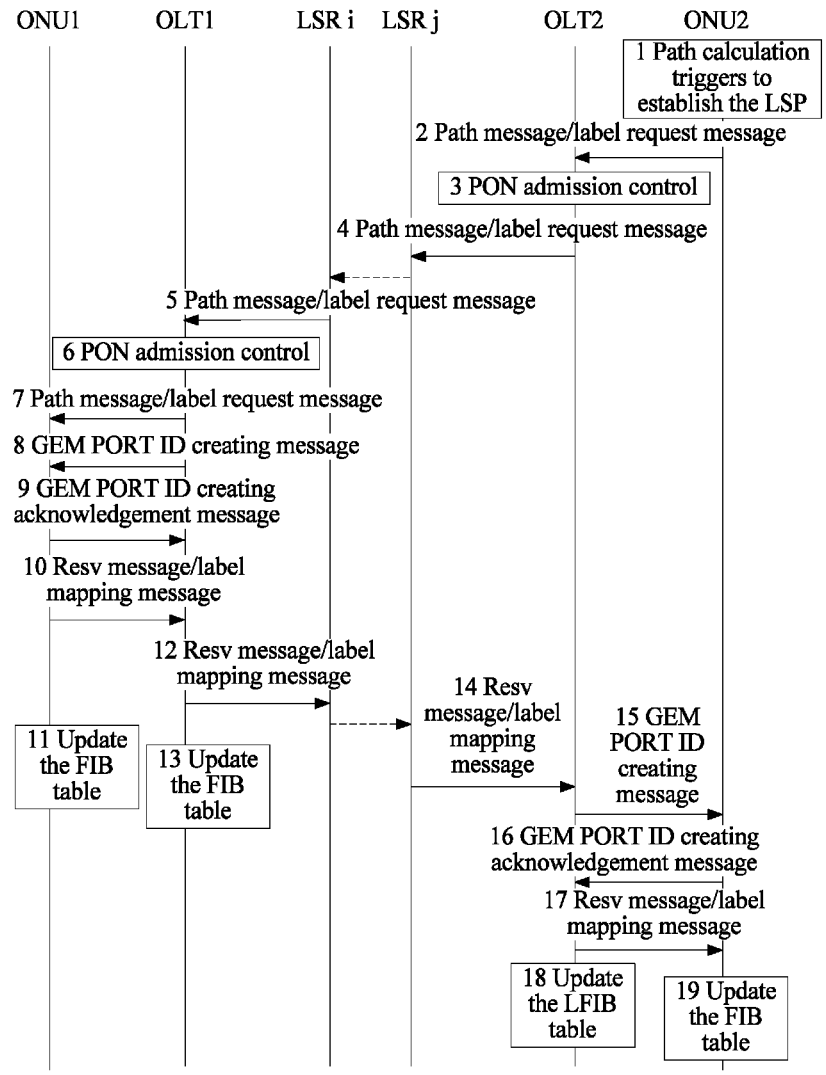
FIG. 10a is a timing chart a of processing of a control plane according to an embodiment of the present invention.

As shown in FIG. 10a, step 501 is further described in the following, and in the process, both the ONU and the OLT support the LDP/RSVP as the LDP, and it is suggested that the ONU adopts the structure as shown in FIG. 4a.

1. The path calculation triggers the ONU2 to establish a PON-based LSP to the ONU1.
2. The PON-based LDP processing unit of the ONU2 requests a PON label to the ONU1 from the OLT2 through a Path message/label request message.
3. After receiving the request, the PON-based LDP processing unit of the OLT2 triggers the PON admission control unit to perform the PON interface bandwidth admission control.
4. When the OLT2 allows establishing the GEM port/LLID channel corresponding to the PON label, the PON-based LDP processing unit of the OLT2 sends a Path message/label request message to the MPLS LSR j to request an MPLS label to the ONU1; the MPLS LSR j also executes the corresponding node admission control, and then requests a PON label to the ONU1 from the next node, . . . , until to the MPLS LSR i.
5. The MPLS LSR i sends the Path message/label request message to the OLT1 to request an MPLS label to the ONU1.
6. After receiving the request, the PON-based LDP processing unit of the OLT1 triggers the PON admission control unit to perform the PON bandwidth admission control.
7. When the OLT1 allows establishing the GEM port/LLID channel corresponding to the PON label, the PON-based LDP processing unit sends the Path message/label request message to the ONU1 to request a PON label to the ONU1.
8. When the OLT1 allows establishing the GEM port/LLID channel corresponding to the PON label, the PON admission control unit triggers the PON configuration unit to send a GEM port ID/LLID creating message to the ONU1.
9. After the ONU1 finishes creating the GEM port ID/LLID, the PON configuration unit sends a GEM port ID/LLID creating acknowledgement message to the OLT1.
10. The PON-based LDP processing unit of the ONU1 returns a Resv message/label mapping message to the OLT1, and distributes the PON label to the ONU1, where the PON label is carried by the Resv message/label mapping message.
11. The ONU1 updates the PON-based FIB table according to the distributed PON label.
12. The PON-based LDP processing unit of the OLT1 returns the Resv message/label mapping message to the MPLS LSR i, and distributes the MPLS label to the ONU1.
13. The OLT1 updates the PON-based LFIB table according to the distributed PON label.
14. The PON-based LDP processing unit of the MPLS LSR j returns the Resv message/label mapping message to the OLT2, and distributes the MPLS label to the ONU1.
15. After receiving the Resv message/label mapping message, the PON-based LDP processing unit of the OLT2 triggers the PON configuration unit to send the GEM port ID/LLID creating acknowledgement message to the ONU2.
16. After the ONU2 finishes creating the GEM port ID/LLID, the PON configuration unit sends the GEM port ID/LLID creating acknowledgement message to the OLT2.
17. After receiving the GEM port ID/LLID creating acknowledgement message, the PON configuration unit of the OLT2 triggers the PON-based LDP processing unit to return the Resv message/label mapping message to the ONU2, and distributes the PON label to the ONU1, where the PON label is carried by the Resv message/label mapping message.

18. The OLT2 updates the PON-based LFIB table according to the distributed PON label.

19. The ONU2 updates the PON-based FIB table according to the distributed PON label.

Figure 10B:
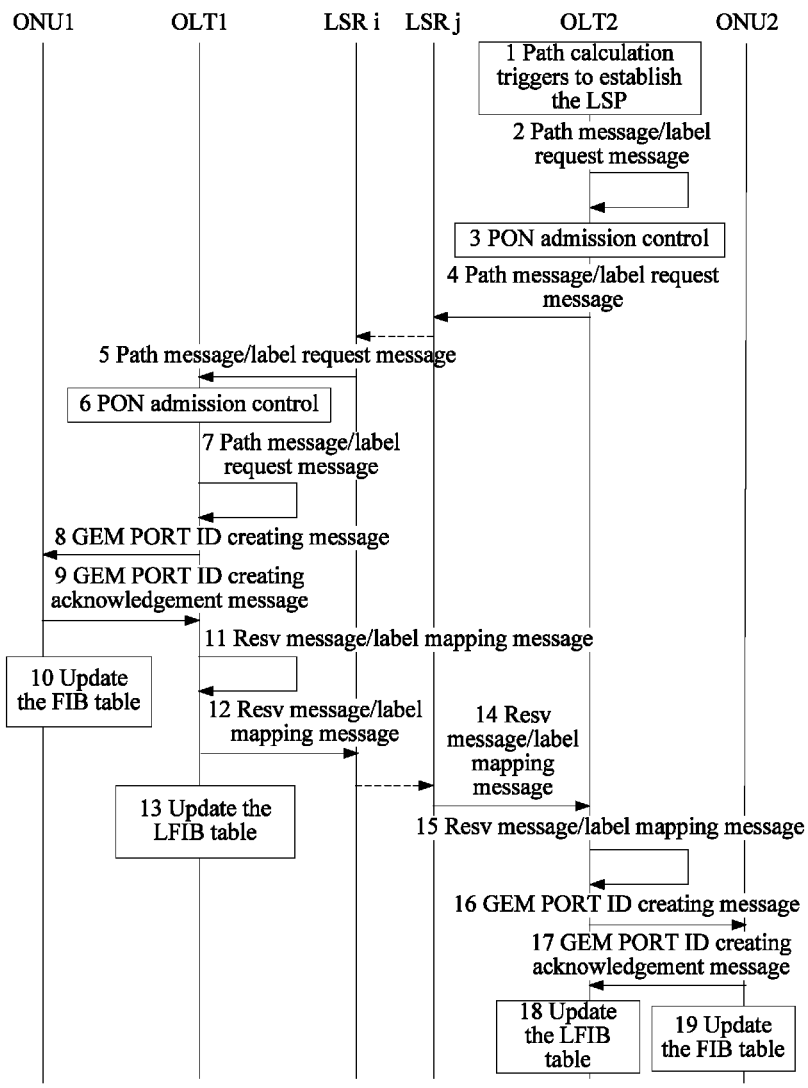
FIG. 10b is a timing chart b of processing of a control plane according to an embodiment of the present invention.

As shown in FIG. 10b, step 501 is further described, and in the process, the OLT supports the LDP/RSVP as the LDP, the ONU adopts the OMCI protocol as the LDP, the OLT needs to support interworking between the PON configuration protocol (for example, the OMCI) and the LDP/RSVP, and it is suggested that the ONU adopts the structure as shown in FIG. 4b.

1. The path calculation triggers the OLT2 to establish a PON-based LSP from the ONU2 to the ONU1.

2-3. The path calculation unit of the OLT2 triggers the PON admission control unit to perform the PON bandwidth admission control. A trigger manner is as follows.

The path calculation unit of the OLT2 simulates the ONU2 to send a Path message/label request message to the PON-based LDP processing unit of the OLT2, so as to request a PON label to the ONU1 from the OLT2; and after receiving the request, the PON-based LDP processing unit of the OLT2 triggers the PON admission control unit to perform the PON bandwidth admission control.

4. When the OLT2 allows establishing the GEM port/LLID channel corresponding to the PON label, the PON-based LDP processing unit of the OLT2 sends the Path message/label request message to the MPLS LSR j to request an MPLS label to the ONU1; the MPLS LSR j also executes the corresponding node admission control, and then requests a PON label to the ONU1 from the next node, . . . , until to the MPLS LSR i.

5. The MPLS LSR i sends the Path message/label request message to the OLT1 to request an MPLS label to the ONU1.

6. After receiving the request, the PON-based LDP processing unit of the OLT1 triggers the PON admission control unit to perform the PON bandwidth admission control.

7-8. When the OLT1 allows establishing the GEM port/LLID channel corresponding to the PON label, the PON-based LDP processing unit triggers the PON configuration unit to send a GEM port ID/LLID creating message to the ONU1, and for the GPON and the next generation GPON, the PON configuration unit is an OMCI protocol processing unit. A trigger manner is as follows.

When the OLT1 allows establishing the GEM port/LLID channel corresponding to the PON label, the PON-based LDP processing unit sends the Path message/label request message to request a PON label to the ONU1, and the request message is received by the PON configuration unit of the OLT1 simulating the ONU1; and after receiving the Path message/label request message, the PON configuration unit triggers to send the GEM port ID/LLID creating message to the ONU1, and for the GPON and the next generation GPON, the PON configuration unit is an OMCI protocol processing unit.

9. After the ONU1 finishes creating the GEM port ID/LLID, the PON configuration unit sends a GEM port ID/LLID creating acknowledgement message to the OLT1, and for the GPON and the next generation GPON, the PON configuration unit is an OMCI protocol processing unit, and the message is sent through the OMCI protocol.

10. The ONU1 updates the PON-based FIB table according to the distributed PON label.

11-12. The PON configuration unit of the OLT1 triggers the PON-based LDP processing unit of the OLT1 to return a Resv message/label mapping message to the MPLS LSR i, and distributes the MPLS label to the ONU1. A trigger manner is as follows.

The PON configuration unit of the OLT1 simulates the ONU1 to return the Resv message/label mapping message to the PON-based LDP processing unit of the OLT1, and distributes the PON label to the ONU1, where the PON label is carried by the Resv message/label mapping message; after receiving the Resv message/label mapping message, the PON-based LDP processing unit of the OLT1 returns the Resv message/label mapping message to the MPLS LSR i, and distributes the MPLS label to the ONU1.

13. The OLT1 updates the PON-based LFIB table according to the distributed PON label.

14. The LDP processing unit of the MPLS LSR j returns the Resv message/label mapping message to the OLT2, and distributes the MPLS label to the ONU1.

15-16. After receiving the Resv message/label mapping message, the PON-based LDP processing unit of the OLT2 triggers the PON configuration unit of the OLT2 to send the GEM port ID/LLID creating acknowledgement message to the ONU2. A trigger manner is as follows.

After receiving the Resv message/label mapping message, the PON-based LDP processing unit of the OLT2 returns the Resv message/label mapping message to the ONU2, and distributes the PON label to the ONU1, where the PON label is carried by the Resv message/label mapping message; the request message is received by the PON configuration unit of the OLT2 simulating the ONU2; after receiving the Resv message/label mapping message, the PON configuration unit of the OLT2 triggers to send the GEM port ID/LLID creating acknowledgement message to the ONU2.

17. After the ONU2 finishes creating the GEM port ID/LLID, the PON configuration unit sends the GEM port ID/LLID creating acknowledgement message to the OLT2.

18. The OLT2 updates the PON-based LFIB table according to the distributed PON label.

19. The ONU2 updates the PON-based FIB table according to the distributed PON label.

Figure 11:
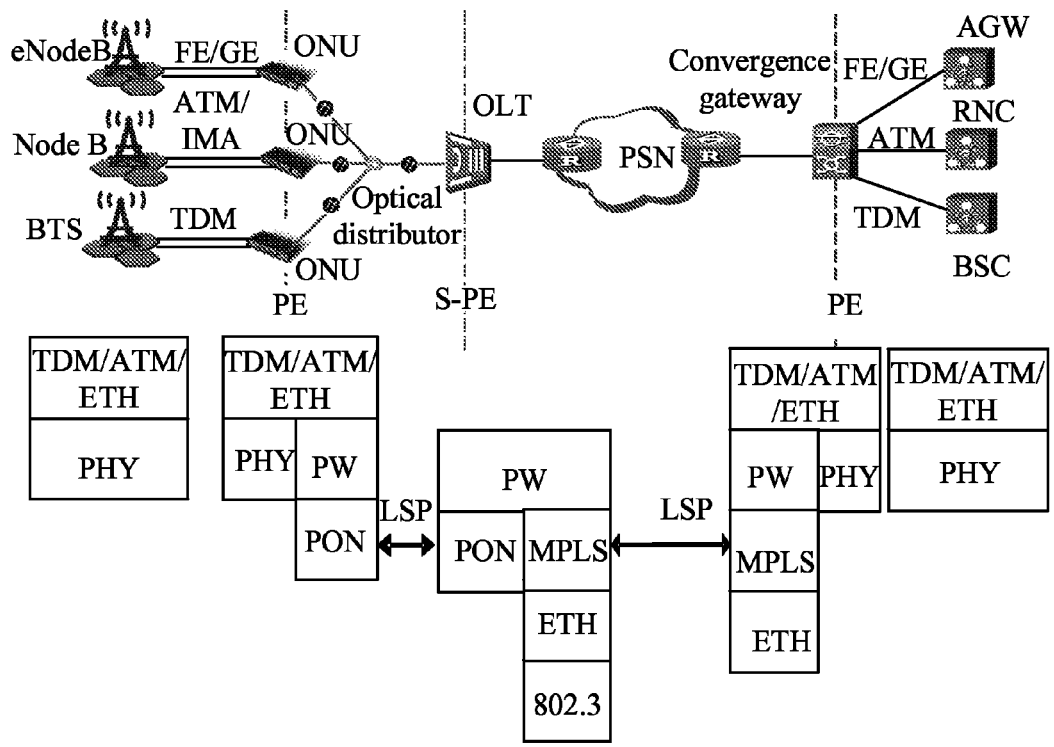
FIG. 11 is a schematic view of implementing a Pseudo Wire (PW) function by a PON-based mobile bearer network according to an embodiment of the present invention.

Further, the ONU may implement a PE function, so as to construct a PON-based VPN. For the GPON and the next generation GPON, the GEM port channel is considered as a special PSN tunnel, the GEM port ID is considered as a special PSN tunnel ID, and the channel constituted by the GEM port may directly bear the PW; and for the EPON and the next generation EPON, the channel constituted by the LLID is considered as a special PSN tunnel, the LLID is considered as a special PSN tunnel ID, and the channel constituted by the LLID may directly bear the PW. A schematic view of implementing the PW function by adopting PW over PON, that is, the PON-based mobile bearer network is as shown in FIG. 11.

Another method for implementing the PW function of the PON-based mobile bearer network is that the PW is borne on the ETH, and the ETH is borne on the PON, where the PSN tunnel may adopt the channel constituted by the GEM port channel/LLID, and here, the ETH layer between the PW and the PON is merely for the purpose of uniform encapsulation; alternatively, the PW is carried by an ETH channel constituted by a virtual local area network identifier.

Figure 12A:
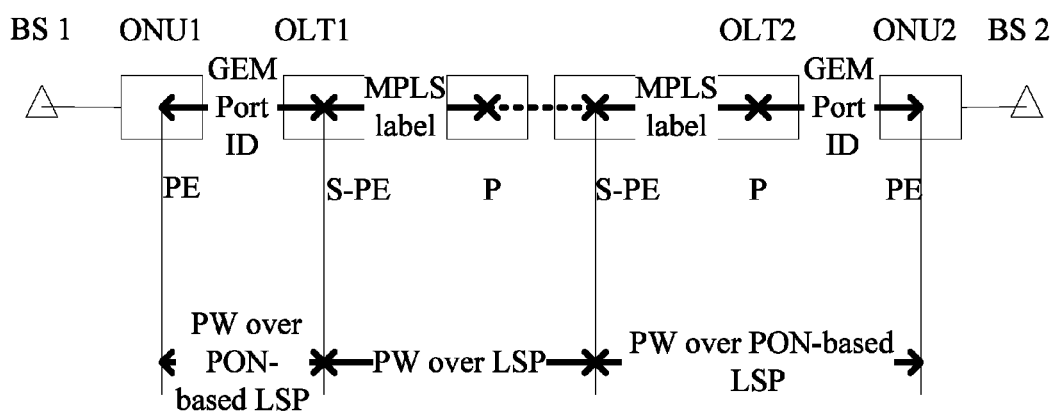
FIG. 12a is a schematic view a of implementing a PON-based Virtual Private Network (VPN) according to an embodiment of the present invention.
Figure 12B:
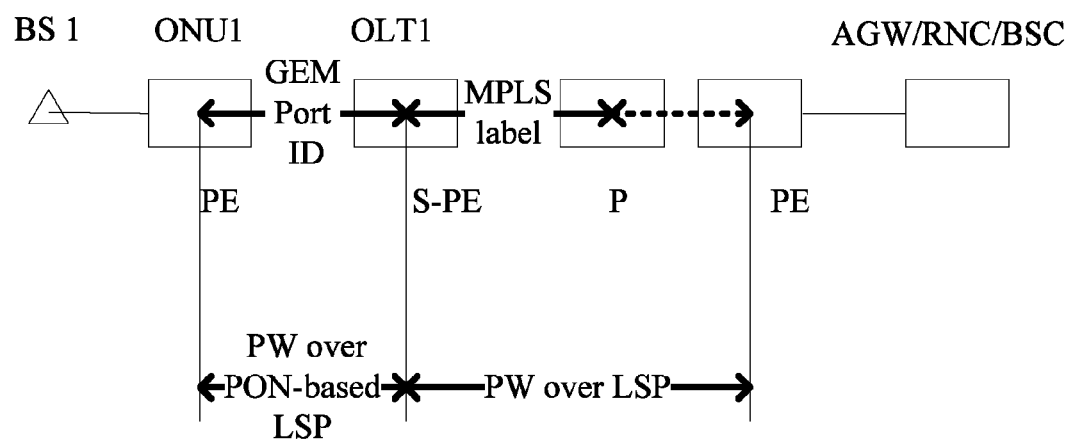
FIG. 12b is a schematic view b of implementing a PON-based VPN according to an embodiment of the present invention.

However, if a single segment of PW is established between the ONU1 and the ONU2, the switching network with PON labels and MPLS labels are used mixed way has a problem of Full Mesh connection. In order to solve the problem, it is suggested to implement the S-PE function at the OLT or the convergence node, and establish multiple segments of PWs to avoid the Full Mesh; and the PON-based PW is fit for a Spoke-Hub topology, for example, as shown in FIGS. 12a and 12b, the PON-based LSP segment is Spoke, and the LSP segment is Hub.

Usually, for a mobile network, in order to ensure a sufficiently low voice time delay, the payload of a voice packet is usually quite small (50% of which being smaller than 64 bytes). Compared with the existing PW borne on the MPLS network, the PW over PON saves the ETH frame header and the MPLS tunnel packet header overhead, so as to greatly improve the transmission efficiency.

As the PON unicast label is a bi-directional label, and the MPLS label is usually a unidirectional label, one PON unicast label may be used in two PON-based LSPs with different directions.

An embodiment of the present invention further provides a system, which includes OLTs and an ONU, where the number of the OLTs is two or more. The OLTs establish a GEM port ID/LLID channel between the OLTs and the ONU according to a GEM port ID/LLID as a PON label, and generate a PON-based LFIB table according to binding information of the PON label for a route; and query the PON-based LFIB table according to the PON label of received data to obtain a corresponding egress port and a corresponding egress label, performs label switching on the input packet, and output the data carrying the corresponding egress label from the corresponding egress port; and may further perform routing and forwarding according to the generated PON-based FIB table.

After establishing a PON-based routing table, the ONU generates a PON-based FIB table according to the PON-based routing table; queries the PON-based FIB table according to a destination address of the data to obtain a corresponding egress port and a corresponding egress label, carries the data in a corresponding PON frame according to the egress label, and outputs the PON frame from the corresponding egress port for performing forwarding.

The embodiments of the present invention are significant for the applications of establishing the TDM, video phone, video conference, and video on demand by using the e2e PON-based LSP, and can ensure the quality of service of the e2e service and improve the communication efficiency, and especially can greatly improve the efficiency of voice communication.

Through the solutions of the embodiments of the present invention, ATM/IMA, E1/T1 TDM, ETH, or IP service is perceived only by a PON-LER edge node (ONU) of a switching network with PON labels and MPLS labels are used mixed way, and a PON-LSR (OLT)/MPLS LSR in the switching network with PON labels and MPLS labels are used mixed way does not need to perceive the ATM/IMA, E1/T1 TDM, ETH, or IP service, so that the PON-LSR (OLT)/MPLS LSR in the network is greatly simplified.

Further, the e2e service forwarding based on the PON-based LSP is established, a metro convergence segment and an optical access segment are combined, and a transmission channel from an edge (ONU) to an edge (aggregate gateway) of a mobile bearer network is formed through the uniform label switching technology, so that problems between network segments in the prior art of different forwarding characteristics, protocol variation, inter-segment conversion, and mapping and control complexity are avoided.

Further, the TDM, the ATM/IMA, the ETH, and the IP services belong to different VPNs, and are isolated from each other, and the transmission path of the PON-based LSP may be dynamically negotiated, so as to constitute uniform resource management of the transmission path among the BSs.

Through the above description of the embodiments, it is apparent to persons skilled in the art that the present invention may be accomplished by software on a necessary universal hardware platform, and definitely may also be accomplished by hardware. Therefore, the above technical solution or the part that makes contributions to the prior art can be substantially embodied in the form of a software product. The computer software product may be stored in a computer readable storage medium such as a ROM/RAM, a magnetic disk, or an optical disk, and contain several instructions to instruct a computer equipment (for example, a personal computer, a server, or a network equipment) to perform the method as described in the embodiments of the present invention or in some parts of the embodiments.

The above descriptions are merely some exemplary embodiments of the present invention, but not intended to limit the protection scope of the present invention. Any variations or replacements that can be easily thought of by persons skilled in the art within the technical scope of the present invention shall fall within the protection scope of the present invention as defined by the appended claims.

What is claimed is:

1. A label switching method, comprising:
   when establishing a Passive Optical Network (PON)-based Label Switching Path (LSP) (PON-based LSP),
      establishing a PON logical service transmission channel between an Optical Line Terminal (OLT) and an Optical Network Unit (ONU), and
   according to an identifier (ID) of the PON logical service transmission channel as a PON label, updating a PON-based Forwarding Information Base (FIB) table on the ONU, and updating a PON-based Label Forwarding Information Base (LFIB) table on the OLT,
   wherein the PON-based LFIB table records a forwarding relationship between an ingress port plus an ingress label and an egress port plus an egress label, and the PON-based FIB table records a forwarding relationship between the ingress port plus a destination address and the egress port plus the egress label; and
   when a data packet arrives at the ONU,
   forwarding, by the ONU, according to the PON-based FIB table on the ONU, the data packet to the OLT, wherein the forwarding the data packet to the OLT comprises: converting the data packet to a packet with the PON label, and forwarding the packet with the PON label to the OLT,
   querying, by the OLT, the PON-based LFIB table according to an ingress PON interface as the ingress port and the ingress label of the received data packet, for performing label switching, and
   transmitting the packet to a next hop node according to the egress port and the egress label after the label switching; or
   when a data packet arrives at the OLT,
   querying, by the OLT, the PON-based LFIB table according to the ingress port and a Multi-protocol Label Switching (MPLS) label as the ingress label of the data packet, for performing label switching,
   transmitting the packet to the ONU according to an egress PON interface as the egress port and an egress PON label as the egress label, and
   forwarding, by the ONU, the received packet with the PON label according to the PON-based FIB table.

2. The label switching method according to claim 1, wherein distribution of the PON label between the OLT and the ONU is implemented through an extended Label Distribution Protocol (LDP) or a Resource Reservation Protocol (RSVP); or implemented through an Optical Network Termination (ONT) Management Control Interface (OMCI) protocol or an Operation, Administration and Maintenance (OAM) protocol.

3. The label switching method according to claim 1, wherein the ingress label is the PON label or the MPLS label, the egress label is the MPLS label or the PON label, the PON label is a Gigabit Passive Optical Network (GPON) Encapsulation Method (GEM) port ID (GEM port ID) or a Logical Link ID (LLID), and the PON logical service transmission channel is a channel corresponding to the GEM port or the LLID.

4. The label switching method according to claim 2, wherein the ingress label is the PON label or the MPLS label, the egress label is the MPLS label or the PON label, the PON label is a Gigabit Passive Optical Network (GPON) Encapsulation Method (GEM) port ID (GEM port ID) or a Logical Link ID (LLID), and the PON logical service transmission channel is a channel corresponding to the GEM port or the LLID.

5. An Optical Line Terminal (OLT), comprising a control plane processing module and a data plane processing module, wherein
the control plane processing module is configured to establish a Passive Optical Network (PON) logical service transmission channel between the OLT and an Optical Network Unit (ONU), distribute a PON label, and generate a PON-based Label Forwarding Information Base (LFIB) table according to the PON label; and
the data plane processing module is configured to query the PON-based LFIB table according to an ingress port and an ingress label of a data packet received from a Multi-protocol Label Switching (MPLS) label switching domain to obtain a corresponding egress port and a corresponding egress label wherein the egress label is a PON label, perform label switching on the input data packet, remove MPLS packet header of the data packet, add a PON frame header to the data packet, wherein the PON frame header comprises the egress label, and output the data packet carrying the corresponding egress label from the corresponding egress port.

6. The OLT according to claim 5, wherein the control plane processing module comprises a PON-based Label Distribution Protocol (LDP) processing unit and a PON configuration unit, wherein
the PON-based LDP processing unit is configured to distribute the PON label, and generate the PON-based LFIB table according to the PON label; and
the PON configuration unit is configured to establish and maintain the PON logical service transmission channel.

7. The OLT according to claim 5, wherein the data plane processing module comprises a PON-based LFIB processing unit, a PON interface processing unit, and a network side interface processing unit, wherein
the PON-based LFIB processing unit is configured to store and maintain the PON-based LFIB table, and implement label switching and forwarding according to the PON-based LFIB table;
the PON interface processing unit is configured to implement a PON interface communication processing function; and
the network side interface processing unit is configured to implement a network side interface communication processing function.

8. The OLT according to claim 7, wherein the data plane processing module further comprises a PON-based Forwarding Information Base (FIB) processing unit, configured to store and maintain a PON-based FIB table, and implement label-based routing and forwarding according to the PON-based FIB table.

9. The OLT according to claim 5, wherein the control plane processing module comprises a PON admission control unit, a routing protocol processing unit, an Internet Protocol (IP) routing table processing unit, a PON-based Label Information Base (LIB) unit, and a path calculation unit,
the PON admission control unit is configured to implement PON interface bandwidth admission control, and trigger execution of a PON admission control through an LDP;
the routing protocol processing unit is configured to generate a PON-based routing table;
the IP routing table processing unit is configured to store and maintain the routing table;
the PON-based LIB unit is configured to store and maintain a PON-based LIB table, the PON-based LIB table being configured to assist the generating of the PON-based LFIB table or generating a PON-based FIB table and the PON-based LFIB table; and
the path calculation unit is configured to trigger establishment of a PON-based Label Switching Path (LSP).

10. The OLT according to claim 6, wherein the data packet is a Multi-protocol Label Switching (MPLS) packet or a PON frame, the ingress label is the PON label or the MPLS label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

11. The OLT according to claim 7, wherein the data packet is a Multi-protocol Label Switching (MPLS) packet or a PON frame, the ingress label is the PON label or the MPLS label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

12. The OLT according to claim 9, wherein the data packet is a Multi-protocol Label Switching (MPLS) packet or a PON frame, the ingress label is the PON label or the MPLS label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

13. The OLT according to claim 6, wherein the PON-based LDP processing unit is further configured to interact with the PON configuration unit, so as to implement interworking between an Optical Network Termination (ONT) Management Control Interface (OMCI) and an LDP or a Resource Reservation Protocol (RSVP), or implement interworking between an Operation, Administration and Maintenance (OAM) protocol and the LDP or the RSVP.

14. An Optical Network Unit (ONU), wherein an Optical Line Terminal (OLT) comprises a control plane processing module and a data plane processing module, wherein
the control plane processing module is configured to cooperate with the ONU to establish a Passive Optical Network (PON) logical service transmission channel between the OLT and the ONU, distribute a PON label, and generate a PON-based Forwarding Information Base (FIB) table according to the PON label, wherein the PON-based FIB table comprises a forwarding relationship between an ingress port plus a destination address and an egress port plus a PON label; and the data plane processing module is configured to query the PON-based FIB table according to a destination address of a data packet to obtain a corresponding egress port and a corresponding PON label, add a PON frame header to the data packet, wherein the PON frame header comprises the PON label, and output the data packet from the egress port for performing forwarding.

15. The ONU according to claim 14, wherein the control plane processing module comprises a PON-based Label Distribution Protocol (LDP) processing unit and a PON configuration unit, wherein the PON-based LDP processing unit is configured to distribute the PON label, and generate the PON-based FIB table according to the PON label; and the PON configuration unit is configured to establish and maintain the PON logical service transmission channel.

16. The ONU according to claim 15, wherein the data plane processing module comprises a PON-based FIB processing unit, a PON interface processing unit, and a network side interface processing unit, wherein the PON-based FIB processing unit is configured to store and maintain the PON-based FIB table, and implement label-based routing and forwarding according to the PON-based FIB table;

the PON interface processing unit is configured to implement a PON interface communication processing function; and the network side interface processing unit is configured to implement a network side interface communication processing function.

17. The ONU according to claim 14, wherein the data packet comprises an Asynchronous Transfer Mode (ATM) cell, a Time Division Multiplexing (TDM) time-slot, an Ethernet (ETH) frame, or an Internet Protocol (IP) packet, the ingress label is the PON label or a Multi-protocol Label Switching (MPLS) label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

18. The ONU according to claim 15, wherein the data packet comprises an Asynchronous Transfer Mode (ATM) cell, a Time Division Multiplexing (TDM) time-slot, an Ethernet (ETH) frame, or an Internet Protocol (IP) packet, the ingress label is the PON label or a Multi-protocol Label Switching (MPLS) label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

19. The ONU according to claim 16, wherein the data packet comprises an Asynchronous Transfer Mode (ATM) cell, a Time Division Multiplexing (TDM) time-slot, an Ethernet (ETH) frame, or an Internet Protocol (IP) packet, the ingress label is the PON label or a Multi-protocol Label Switching (MPLS) label, the egress label is the MPLS label or the PON label, the PON label is a Gigabit Passive Optical Network (GPON) Encapsulation Method (GEM) port identifier (GEM port ID) or a Logical Link ID (LLID), and the PON logical service transmission channel is a channel corresponding to the GEM port or the LLID.

20. The ONU according to claim 15, wherein the control plane processing module further comprises a routing protocol processing unit, an IP routing table processing unit, a PON-based Label Information Base (LIB) unit, and a path calculation unit, wherein the routing protocol processing unit is configured to generate a PON-based routing table;

the IP routing table processing unit is configured to store and maintain the PON-based routing table;

the PON-based LIB unit is configured to store and maintain a PON-based LIB table, the PON-based LIB table being configured to assist generating the PON-based FIB table; and the path calculation unit is configured to trigger establishment of a PON-based Label Switching Path (LSP).

* * * * *